(12) United States Patent
Weron

(10) Patent No.: US 8,627,594 B1
(45) Date of Patent: Jan. 14, 2014

(54) FISHING LURE WITH CHANGEABLE APPEARANCE

(75) Inventor: Corby J. Weron, Tea, SD (US)

(73) Assignee: GoFish Tackle, LLC, Centerville, SD (US)

( * ) Notice: Subject to any disclaimer, the term of this patent is extended or adjusted under 35 U.S.C. 154(b) by 0 days.

(21) Appl. No.: 12/695,501

(22) Filed: Jan. 28, 2010

(51) Int. Cl.
*A01K 85/18* (2006.01)

(52) U.S. Cl.
USPC .......................................... 43/42.09; 43/42.32

(58) Field of Classification Search
USPC .............................. 43/42.09, 42, 42.32, 42.47
IPC ............................................. A01K 85/00,85/18
See application file for complete search history.

(56) References Cited

U.S. PATENT DOCUMENTS

| | | | | |
|---|---|---|---|---|
| 1,084,517 A | * | 1/1914 | Wilson | 43/42.47 |
| 1,881,823 A | * | 10/1932 | McKenzie | 43/42.33 |
| 2,563,386 A | * | 8/1951 | Wight, Jr. | 43/42.22 |
| 2,579,991 A | * | 12/1951 | Wood | 43/42.22 |
| 2,741,067 A | * | 4/1956 | Cox | 43/44.9 |
| 2,764,834 A | * | 10/1956 | Klein | 43/42.09 |
| 3,392,474 A | * | 7/1968 | De Weese | 43/42.09 |
| 3,418,745 A | * | 12/1968 | Loos | 43/42.09 |
| 3,497,987 A | * | 3/1970 | Perrin | 43/42.28 |
| 3,611,614 A | | 10/1971 | Ward | |
| 3,675,358 A | * | 7/1972 | Jones | 43/42.09 |
| 3,909,974 A | * | 10/1975 | Kent | 43/42.31 |
| 3,913,257 A | * | 10/1975 | Colgan | 43/42.09 |
| 4,073,084 A | * | 2/1978 | Favron | 43/42.35 |
| 4,141,170 A | * | 2/1979 | Fosher | 43/42.24 |
| 4,266,360 A | | 5/1981 | Smith | |
| 4,402,155 A | * | 9/1983 | Mumma | 43/42.09 |
| 4,697,378 A | | 10/1987 | Tunstall | |
| 4,791,751 A | * | 12/1988 | Francklyn | 43/44.6 |
| 4,831,768 A | | 5/1989 | Sorace | |
| 4,848,023 A | * | 7/1989 | Ryder et al. | 43/44.2 |
| 4,941,280 A | | 7/1990 | Rinaldi | |
| 5,036,617 A | | 8/1991 | Waldrip | |
| 5,088,226 A | * | 2/1992 | Bazinet | 43/42.03 |
| 5,333,406 A | * | 8/1994 | Wylie | 43/42.09 |
| 5,678,349 A | * | 10/1997 | Pacora | 43/42.09 |
| 5,858,494 A | * | 1/1999 | Cherkas et al. | 428/40.1 |
| 6,052,938 A | * | 4/2000 | Marusak et al. | 43/42.09 |
| 6,058,643 A | * | 5/2000 | Marusak et al. | 43/42.11 |
| 6,058,645 A | * | 5/2000 | Lummis | 43/42.33 |
| 6,061,947 A | * | 5/2000 | Mooers | 43/42.06 |
| 6,061,948 A | | 5/2000 | Boucek | |
| 6,079,145 A | | 6/2000 | Barringer | |
| 6,393,757 B2 | | 5/2002 | Bomann | |
| 6,606,815 B1 | * | 8/2003 | Toris | 43/42.09 |
| 6,912,808 B1 | | 7/2005 | Mak | |
| 7,263,798 B2 | * | 9/2007 | Nichols | 43/42.09 |

(Continued)

*Primary Examiner* — Darren W Ark
*Assistant Examiner* — Lisa Tsang
(74) *Attorney, Agent, or Firm* — Jeffrey A. Proehl; Woods, Fuller, Shultz & Smith, P.C.

(57) ABSTRACT

A fishing lure with changeable appearance may comprise a lure body having an exterior surface, and a midline plane extending through the lure body and bisecting the lure body into two lateral sections. The lure may also comprise a cover assembly removably covering at least a portion of the lure body. The cover assembly may comprise at least two parts being configured to cover a portion of the exterior surface of the lure body when the cover assembly is in a mounted condition. The at least two parts may be separable from the lure body when the cover assembly is in a dismounted condition.

15 Claims, 10 Drawing Sheets

(56) References Cited

U.S. PATENT DOCUMENTS

| | | |
|---|---|---|
| 8,402,688 B2 * 3/2013 | Choi | 43/42.31 |
| 2002/0073606 A1 6/2002 | Mameamskum | |
| 2006/0010764 A1 * 1/2006 | Frawley et al. | 43/42.09 |
| 2007/0199233 A1 * 8/2007 | Higgin | 43/42.09 |
| 2009/0282726 A1 * 11/2009 | Herasymchuk | 43/42.23 |
| 2009/0307959 A1 * 12/2009 | Hughes | 43/42.15 |
| 2010/0101138 A1 * 4/2010 | Perrick | 43/42.39 |
| 2010/0287812 A2 * 11/2010 | Hughes | 43/42.15 |

* cited by examiner

FISHING LURE WITH CHANGEABLE APPEARANCE

BACKGROUND

1. Field

The present disclosure relates to fishing lures and more particularly pertains to a new fishing lure with changeable appearance for providing a lure with a variety of different appearances using a few easily replaceable parts that conveniently and compactly store in a tackle box or other carrier.

2. Description of the Prior Art

The use of fishing lures in the sport of fishing is well known. It is typical that a fisher employs more than one type and style of lure, and often the fisher accumulates a collection of lures for use under different fishing conditions or as is desired by the fisher. A large number of different lures can take up a large amount of area for storage, and carrying these lures around to the favorite fishing location can be difficult, even if the fisher utilizes a tackle box. Moreover, the fisher may be discouraged from carrying all, or even a large number, of his or her lures to the fishing location due to the bulk and weight of the lures in the tackle box or other container.

SUMMARY

In view of the foregoing, the present disclosure describes a new fishing lure with changeable appearance which may be utilized for providing a lure with a variety of different appearances using a few easily replaceable parts that conveniently and compactly store in a tackle box or other carrier.

The present disclosure relates to a fishing lure with changeable appearance, which comprises a lure body having an exterior surface, and a midline plane extending through the lure body and bisecting the lure body into two lateral sections. A cover assembly removably covers at least a portion of the lure body. The cover assembly comprises at least two parts configured to cover a portion of the exterior surface of the lure body when the cover assembly is in a mounted condition. The at least two parts are separable from the lure body when the cover assembly is in a dismounted condition.

In another aspect, a fishing lure with changeable appearance is disclosed that comprises a lure body having an exterior surface with a shape, and a midline plane extending through the lure body and bisecting the lure body into two lateral sections. A removable cover assembly covers at least a portion of the exterior surface of the lure body, and has an outer surface with a shape substantially corresponding to the shape of the at least a portion of the exterior surface of the lure body covered by the cover assembly. The removable cover assembly comprises at least two parts connectable to provide a mounted condition and separable from the lure body when the cover assembly is in a dismounted condition. Each of the at least two parts of the cover assembly comprise a shell part and at least one mounting element on the shell part to removably mount the shell part on the lure body.

In yet another aspect, a cover assembly is disclosed for a fishing lure having a lure body with an exterior surface and a midline plane extending through the lure body and bisecting the lure body into two lateral sections. The cover assembly comprises at least two parts configured to cover a portion of the exterior surface of the lure body when the cover assembly is in a mounted condition. The at least two parts are separable from the lure body when the cover assembly is in a dismounted condition. Each of the at least two parts of the cover assembly comprises a shell part and at least one mounting element on the shell part to removably mount the shell part on the lure body. The shell part is configured to cover substantially an entirety of the exterior surface of the lure body located on one side of the midline plane so that the parts of the cover assembly collectively cover both lateral sides of the lure body, the shell part including a contoured wall having an inner surface and an outer surface with a substantially uniform thickness therebetween.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
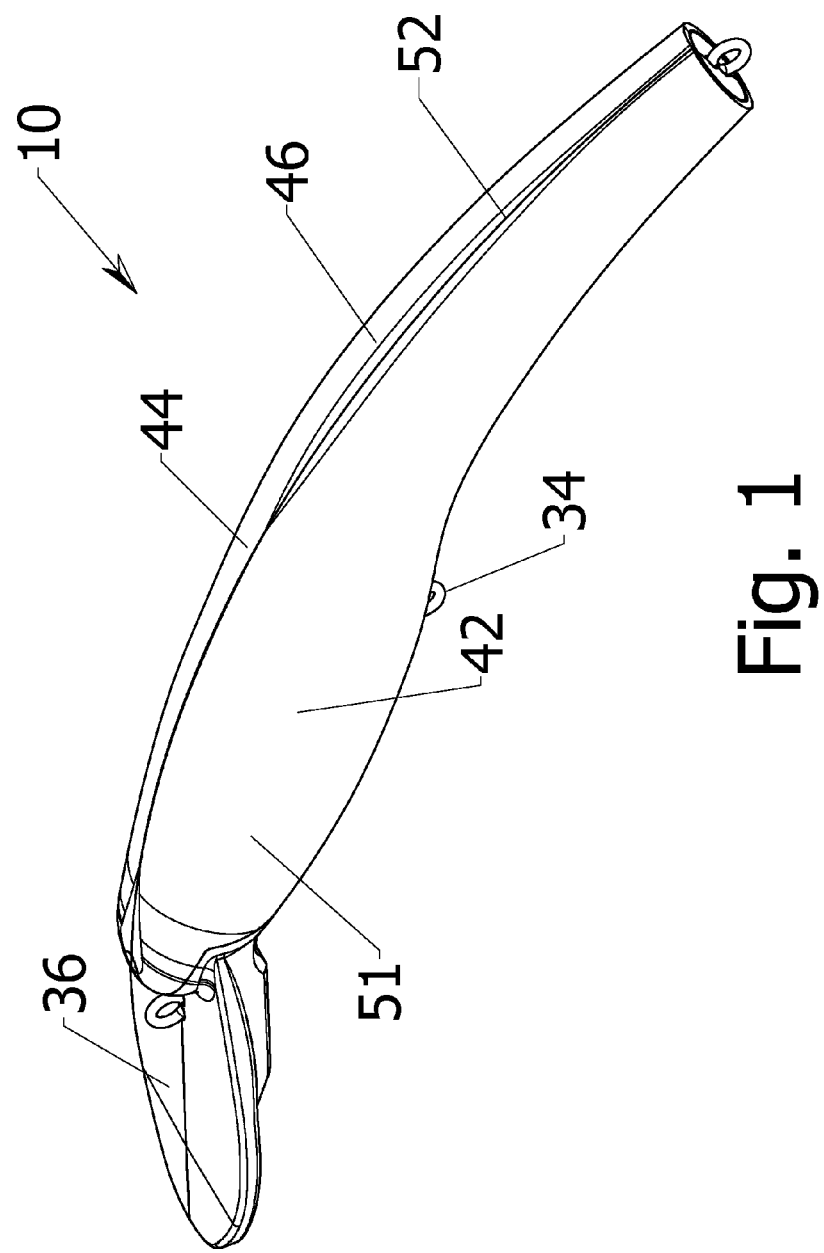
FIG. 1 is a schematic perspective view of a new fishing lure with changeable appearance according to the present disclosure, with the cover assembly shown in the mounted condition with respect to the lure body.
Figure 2:
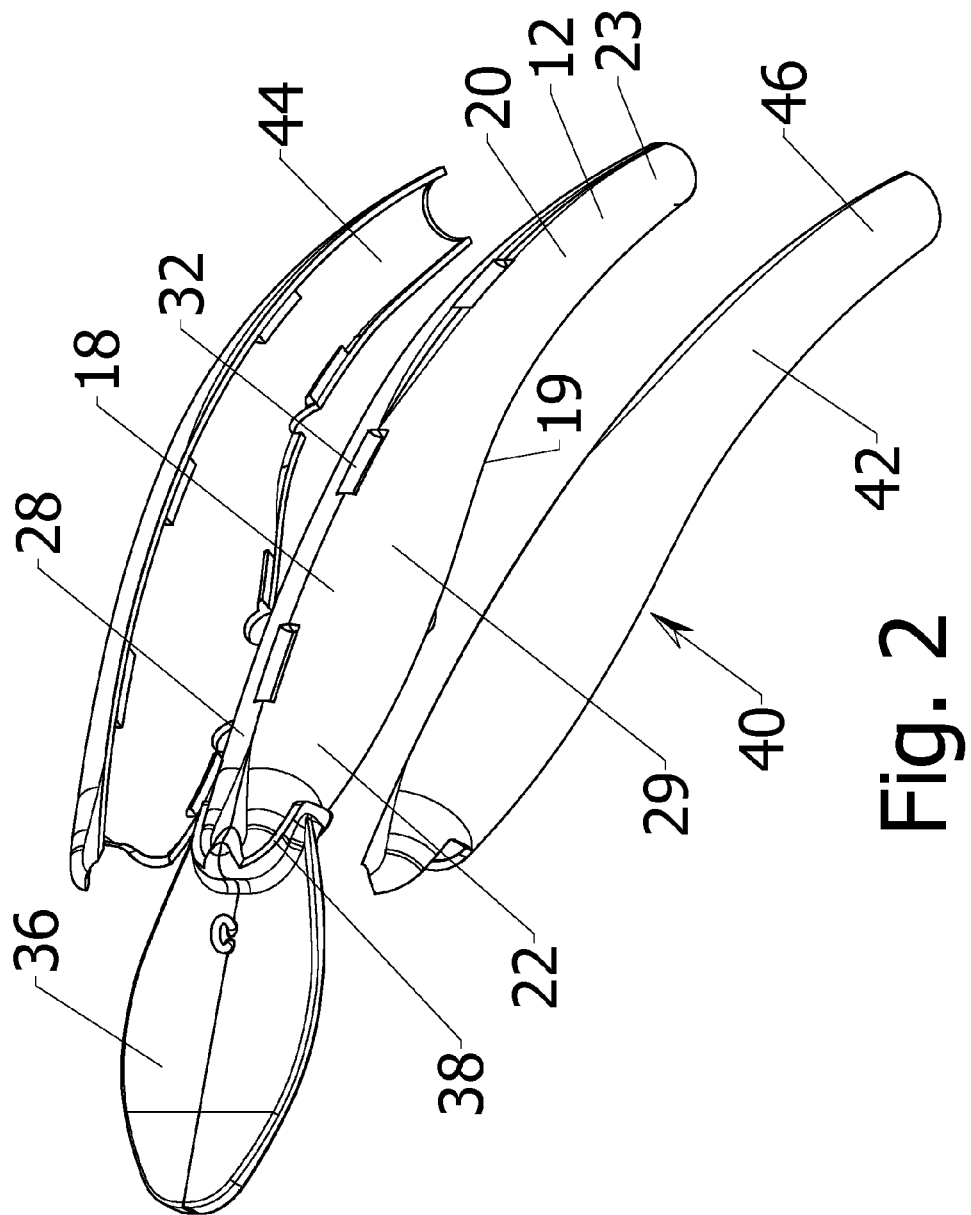
FIG. 2 is a schematic perspective view of the lure with the parts of the cover assembly shown exploded away from the lure body in the dismounted condition of the cover assembly
Figure 3:
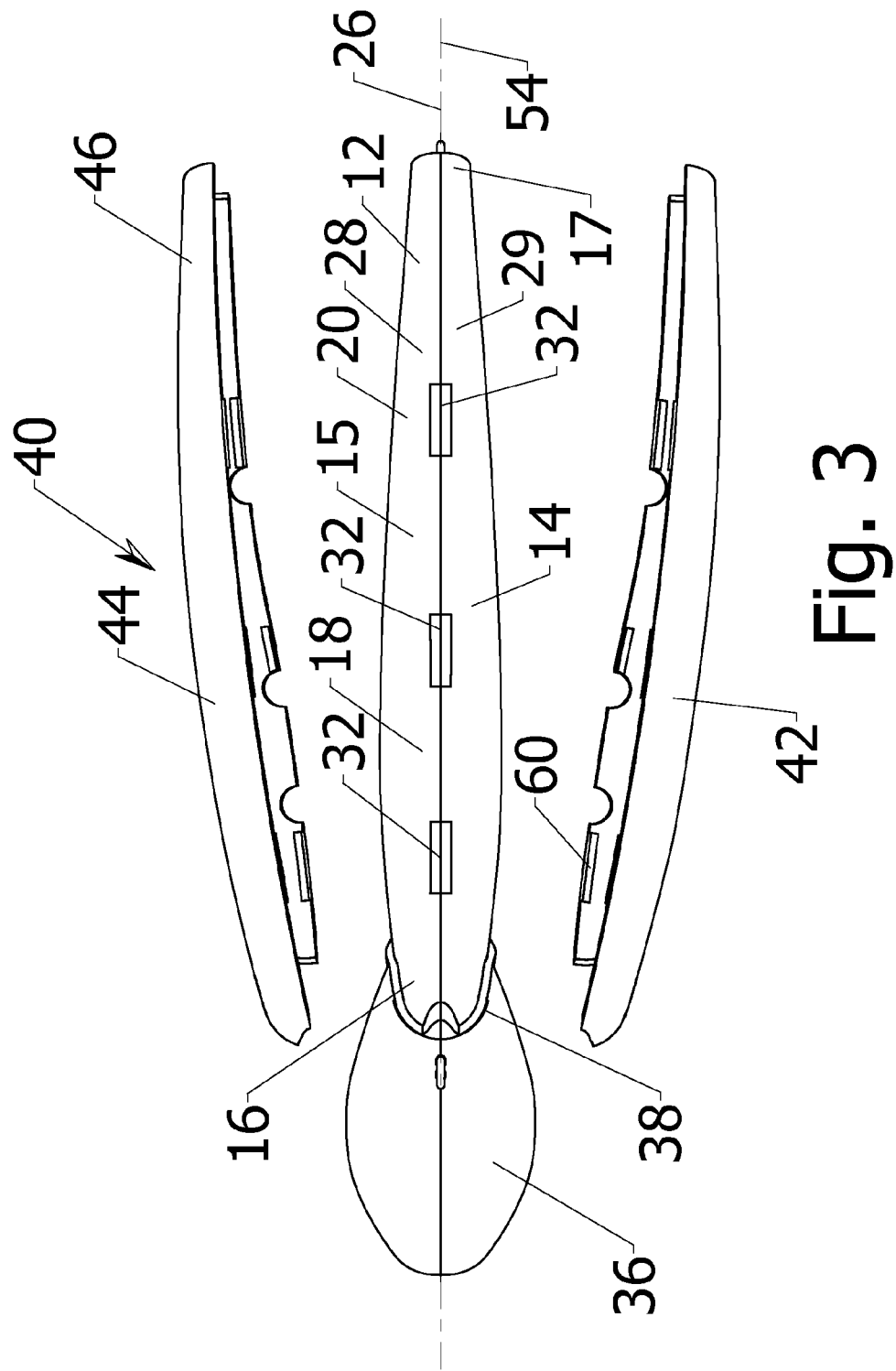
FIG. 3 is a schematic top exploded view of the lure with the cover assembly in the dismounted condition.
Figure 4:
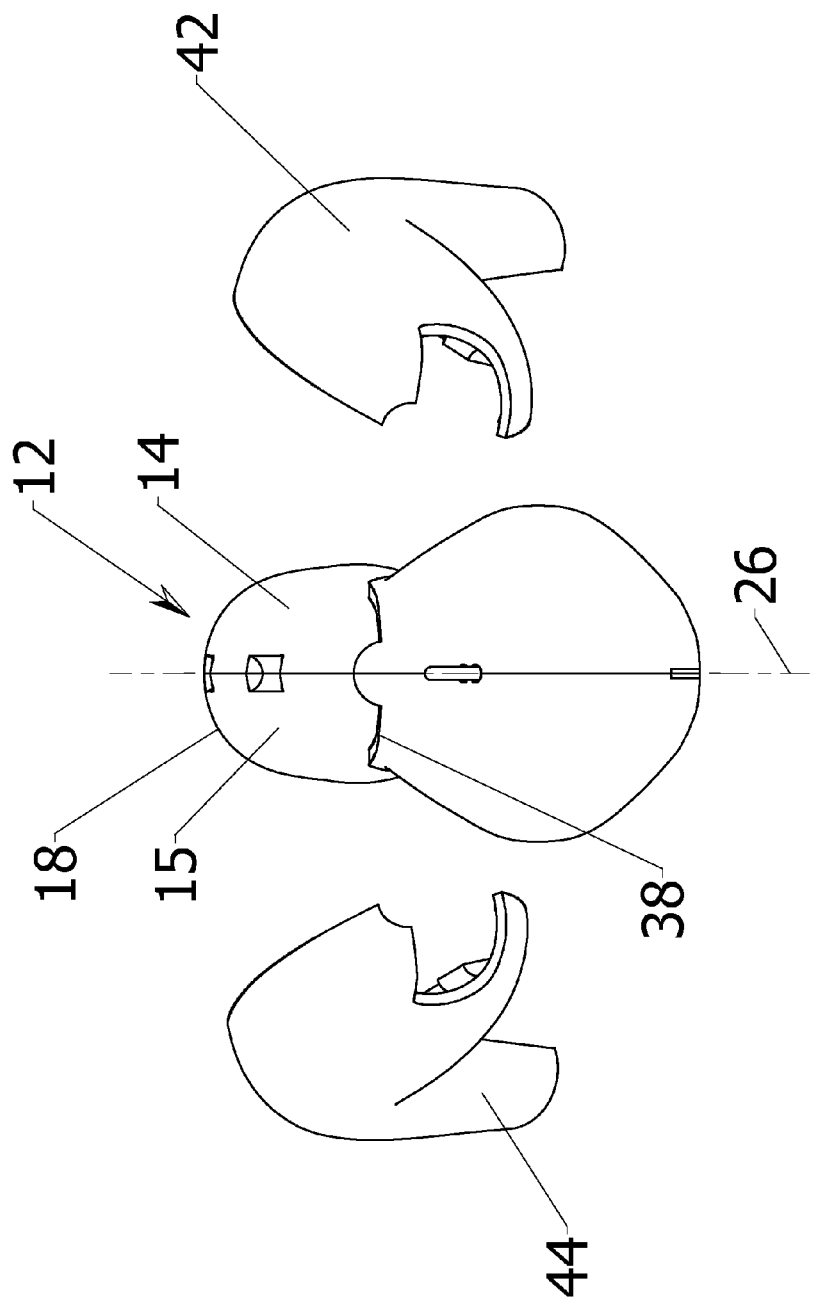
FIG. 4 is a schematic front end exploded view of the lure with the parts of the cover assembly in the dismounted condition.
Figure 5:
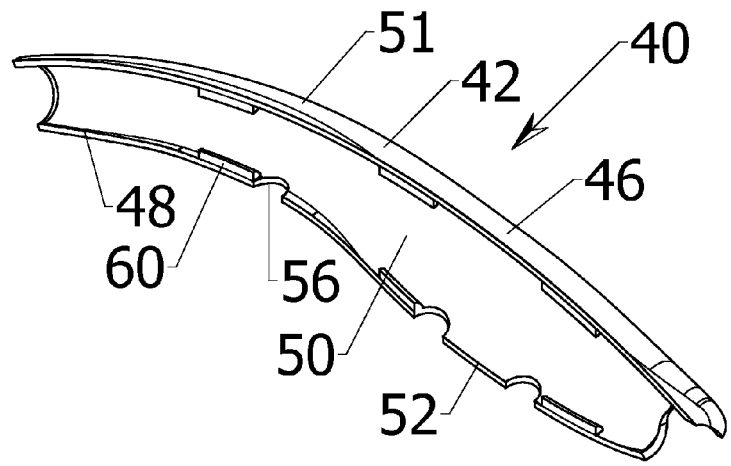
FIG. 5 is a schematic perspective view of the shell part of the cover assembly.
Figure 6:
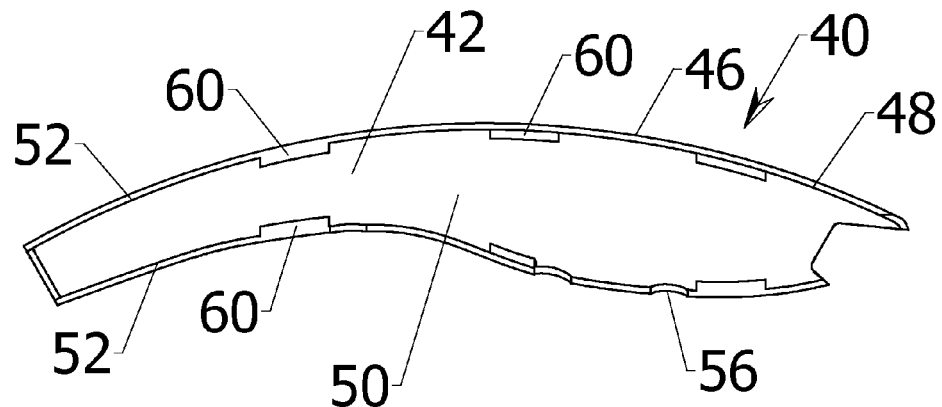
FIG. 6 is a schematic side view of the interior of the shell part of the cover assembly.
Figure 7:
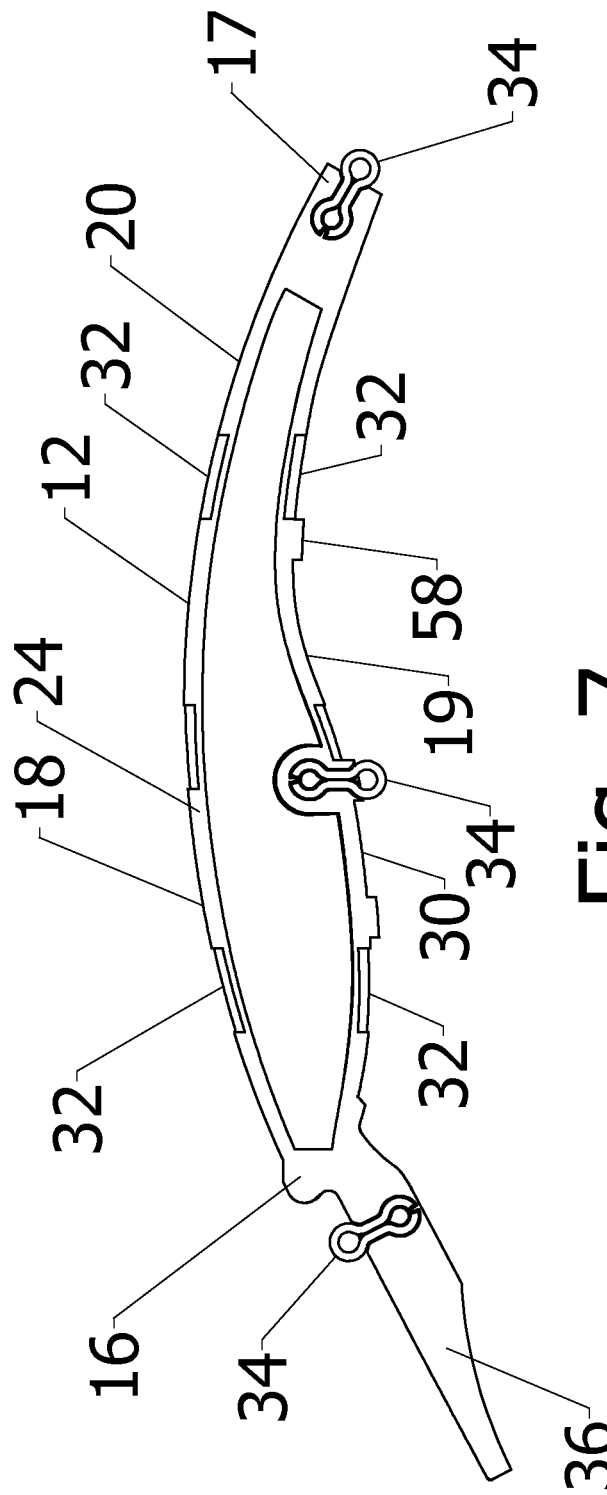
FIG. 7 is a schematic side sectional view of the lure body of the illustrative embodiment.
Figure 8:
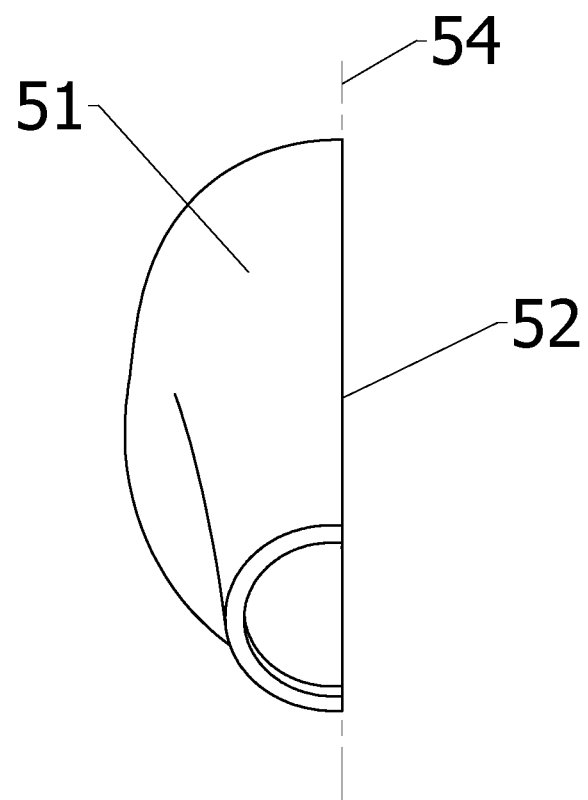
FIG. 8 is a schematic rear view of the shell part of the cover assembly.

With reference now to the drawings, and in particular to FIGS. 1 through 11 thereof, a new fishing lure with changeable appearance embodying the principles and concepts of the disclosed subject matter will be described.

The disclosure generally relates to a fishing lure 10 that is capable of having its appearance changed to a number of different appearances. Generally, the fishing lure may include a lure body 12 which may include one or more attachment elements 34 for attaching items such as hooks to the lure body, an appendage 36 for affecting movement of the assembly in the water, and at least one, and preferably a plurality of, removable cover assemblies 40 that may be interchangeably mounted on the lure body 12. Each of the interchangeable cover assemblies may have a different appearance, for example, color, shape, textures, reflectivity, etc. such that the appearance of the fishing lure may be changed by interchanging the cover assembly on the lure body while utilizing the same lure body.

In greater detail, the fishing lure 10 may comprise a lure body 12 which may have an elongated shape with lateral sides 14, 15, although this configuration is not critical to the invention. The lure body 12 may have a front end 16 and a rear end 17, as well as a top 18 that is located upwardly when the lure body is oriented normally for use, and a bottom 19 located downwardly when the lure body is oriented normally for use. The lure body 12 may have an exterior surface 20, which may generally have a shape resembling an article of bait, although this is not critical. For example, the exterior surface 20 may have a shape resembling a fish with a relatively thicker forward portion 22 and a relatively thinner rearward portion 23. As shown in the illustrative embodiments of the drawings, the shape of the exterior surface 20 in a plane oriented substantially perpendicular to an axis that extends from the front end 16 to the rear end 17 of the lure body may be substantially circular at at least the rear end 17 (see, for example, FIG. 1). The lure body 12 may be substantially hollow within an exterior wall 24, although the interior of the exterior wall may be filled with a material.

A midline plane 26 may extend through the lure body 12 from the front end 16 to the rear end 17, and may bisect the exterior surface of the lure body into two lateral sections 28, 29. The lure body 12 may have a keel line 30 that extends between the front end 16 and the rear end 17 along an intersection of the midline plane 26 and the exterior surface 20 along the bottom 19 of the lure body. The lure body 12 may include at least one slot 32 formed on the exterior surface 20 of the lure body. The slot may extend in a longitudinal direction of the lure body, and may be located adjacent to the midline plane 26 of the lure body, such as along the keel line of the body 12. A plurality of slots may be formed on the exterior surface 20, and the slots may be arrayed along the top 18 and the bottom 19 of the lure body.

The fishing lure 10 may further include at least one attachment element 34 on the lure body 12 that provides a point of attachment for, as an example, a hook. The attachment element 34 may extend from the exterior surface 20 of the lure body 12. The attachment element 34 may comprise an eyelet for hanging a hook thereon. In some preferred embodiments, the attachment element or elements are located on the midline plane 26 of the lure body. For example, an attachment element 34 may be located along the keel line 30 of the lure body 12, and an attachment element may be located at the rear end 17 of the lure body.

An appendage 36 may be mounted on the lure body 12 of the lure 10. The appendage 36 may extend from the exterior surface 20 of the body, and may extend in a forward direction from the front end 16 of the body. The appendage 36 may comprise a lip for the lure 10, and may be generally planar in shape. A shoulder 38 may extend along at least a portion of a juncture between the appendage 36 and the exterior surface 20 of the lure body, and the appendage may form at least a portion of the shoulder 38.

The fishing lure 10 may also include a removable cover assembly 40 for covering at least a portion of the lure body 12. The cover assembly 40 may have a mounted condition (see FIG. 1) on the lure body and a dismounted condition (see FIGS. 2, 3, and 4) in which the cover assembly is removed from the body. In some embodiments, the removable cover assembly 40 covers substantially an entirety of the exterior surface 20 of the lure body. The removable cover assembly 40 may comprise at least two parts 42, 44, and the parts may be configured so that together the two parts collectively cover substantially an entirety of the exterior surface of the lure body. The parts 42, 44 may be separable from the lure body 12 when the cover assembly 40 is in the dismounted condition. Each of the parts 42, 44 may be substantially identical mirror images of each other, but such identity is not critical to the invention. Moreover, for the purposes of this description, one of the parts 42 will be described in greater detail with the understanding that the other part 44 may include the same features in a mirror image relationship.

Each of the parts 42, 44 may comprise a shell part 46, and the shell part may be configured to cover a portion of the exterior surface 20 of the body 12 that is located on one side 14, 15 of the midline plane 26. In some preferred embodiments, the shell part 46 may be configured to cover substantially an entirety of one of the lateral sections 28, 29 of the exterior surface 20 located on one side of the midline plane 26. The shell part 46 may include a contoured wall 48 that has an inner surface 50 and an outer surface 51. The inner surface 50 of the wall 48 may face the exterior surface 20 of the lure body 12 when the cover assembly 40 is in the mounted condition, and the outer surface 51 may be directed away from the lure body 12 when in the mounted condition. The inner surface 50 may be substantially concave in shape, and the outer surface 51 may be substantially convex in shape.

The shell part 46 may have a perimeter edge 52 that is located between the inner 50 and outer 51 surfaces. The perimeter edge 52 may generally lie in an edge plane 54, although not all portions of the edge 52 are necessarily located in the edge plane. The edge plane 54 of the edge 52 may lie generally in the midline plane 26 of the body 12 when the shell part 46 is in the mounted condition on the body. Additionally, at least one notch 56 may be formed in the shell part 46 at a location along the perimeter edge 52 for, as an example, receiving an alignment protrusion 58 extending from the body 12 when the cover assembly is in the mounted condition. The protrusion 58 may be located along the keel line 30 of the body, and may extend into notches on each of the shell parts 42, 44 of the assembly 40.

At least one mounting element 60 may be located on the shell part 46 that functions removably mount the shell part on the lure body 12. The mounting element 60 may be movable into the slot 32 formed on the exterior surface 20 of the lure body as the cover assembly 40 is moved from the dismounted condition to the mounted condition on the body 12, and may be movable out of the slot 32 when the assembly 40 is moved from the mounted to the dismounted condition on the body 12. The mounting element 60 may be located along the perimeter edge 52 of the shell part 46 to engage slots located at or adjacent to the midline plane 26. A plurality of the mounting elements 60 may be included on the shell part 46, and preferably the mounting elements are positioned along the perimeter edge 52 of the shell part. The plurality of mounting elements 60 may include one or more pairs of mounting elements in which a first mounting element of the pair is located on an upper portion of the perimeter edge 52 and a second mounting element of the pair is located on a lower portion of the perimeter edge 52 in a position that is generally opposed to the position of the first mounting element of the pair.

Figure 9:
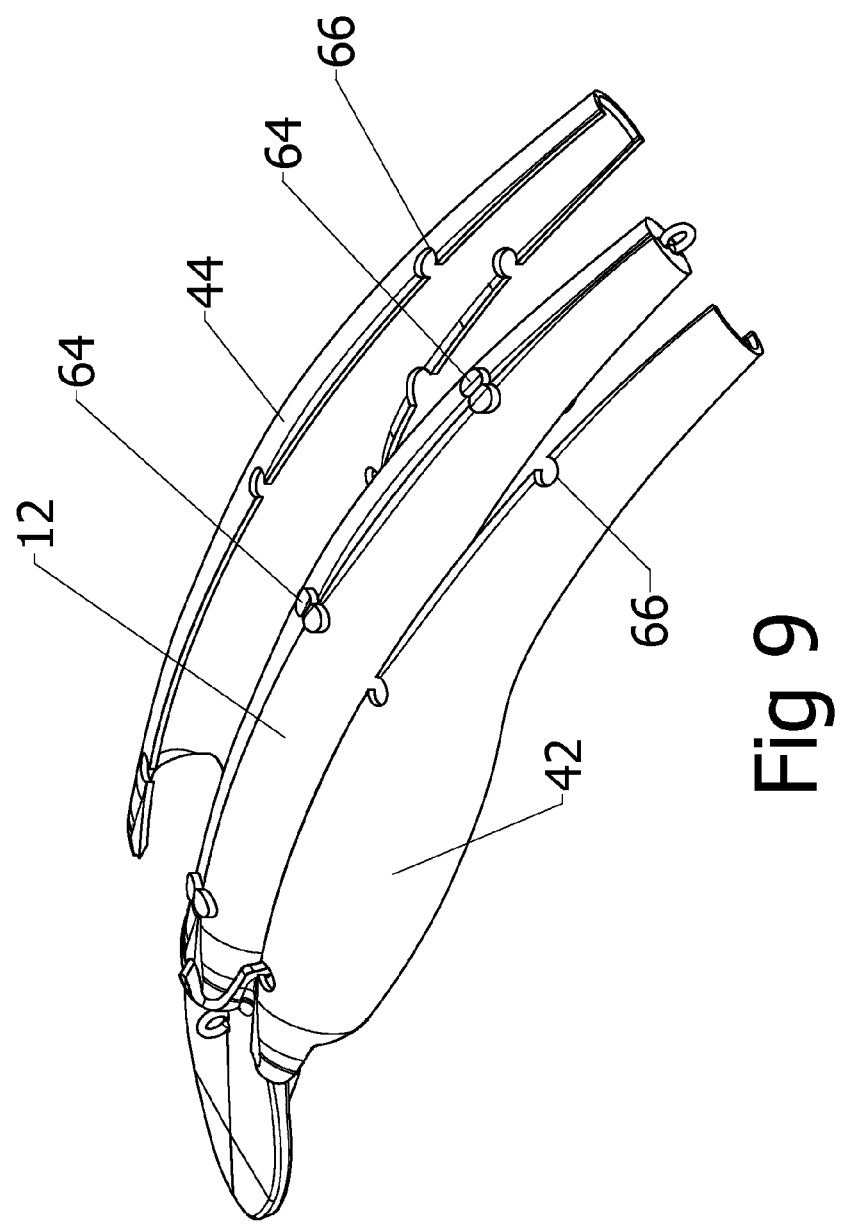
FIG. 9 is a schematic exploded perspective view of a lure body with a cover assembly showing an optional mounting element configuration for connecting the shell parts of the cover assembly to the lure body.
Figure 10:
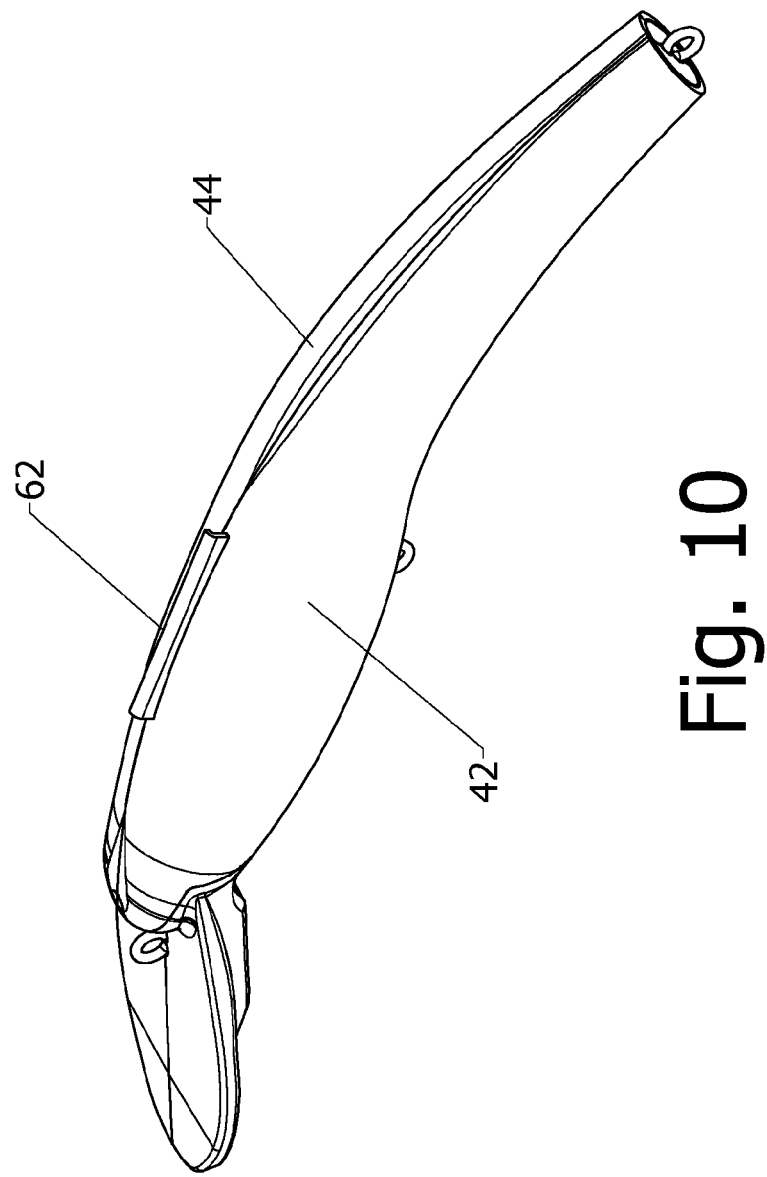
FIG. 10 is a schematic perspective view of a lure body with cover assembly installed showing an optional hinge connecting the shell parts of the cover assembly together.

As illustratively shown in FIGS. 1 through 8, the mounting element or elements 60 may each comprise a tab that extends from the shell part 46 to extend or insert into one of the slots 32 of the lure body. The tab 60 may thus protrude from the perimeter edge 52 of the shell part. Other configurations may be employed as well. As shown in FIG. 9, one or more nubs 64 may be formed on the lure body so as to protrude from the surface of the lure body, and the shell parts of the cover assembly may be configured to removably receive the protruding nub or nubs. The shell parts may include, for example, recesses 66 to accept the nubs. In the illustrative embodiment, the nubs 64 are formed on the lure body at spaced locations along the intersection of the midline plane with the exterior wall of the lure body, and the recesses 66 are formed along the perimeter edges of the shell parts, although this configuration is not the only configuration possible.

To further assist in the mounting of the shell part 46 on the lure body, a portion of the shell part may be engagable with the shoulder 38 that is formed about at least a portion of the appendage. The shoulder 38 may form a groove about at least a portion of the appendage 36 that accepts an edge portion of the shell part 46 to help hold the end portion of the shell part in the mounted condition.

The lure body 12 may be formed of a substantially rigid material that does not permit flexing of the body without the application of a significant amount of force, although it is within the scope of the invention that the lure body be formed of a material that does permit some degree of flexing of the body. Also, the surface of the lure body may be relatively hard, and resistant to deformation, although the surface of the body may exhibit some compliance. The parts 42, 44 may also be formed of a substantially rigid material, although some degree of flexibility is desirable to permit the part to expand to allow the tabs of the mounting elements to move into and out of the slots of the body. The flexibility of the material of the parts 42, 44 is preferably combined with a degree of resiliency so that the tabs are held in the slots by this characteristic while in the mounted condition.

While the illustrative embodiments of the lure 10 have a cover assembly 40 comprising a pair of parts 42, 44 that are separate pieces that are brought together when mounted on the lure body, the configuration of the cover assembly may have other forms. For example, the parts 42, 44 of the cover assembly may be joined together by a structure such as a living hinge 62, which is illustratively shown in FIG. 10. Such a living hinge structure could be located, for example, along an upper portion of the perimeter edge 52. Other structures may also be employed.

Figure 11:
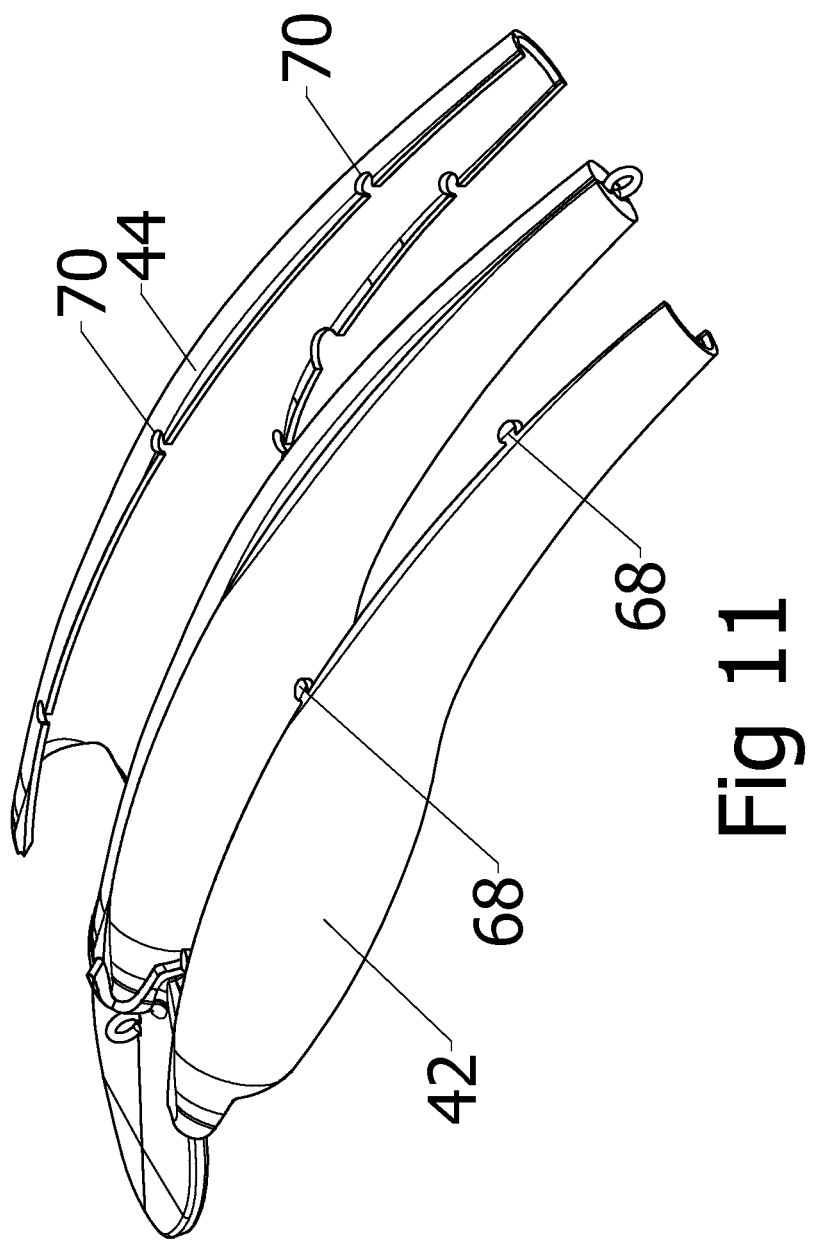
FIG. 11 is a schematic exploded perspective view of a lure body with a cover assembly showing an optional mounting element configuration for connecting together the shell parts of the cover assembly to the lure body.

It should be recognized that the cover assembly 40 need not only be employed on specially-made lure bodies, and it is within the scope of the invention that the cover assembly may be adapted for use on existing lure bodies that were not originally adapted or designed for use with the cover assembly. The configuration of the mounting elements on the parts 42, 44 may be adapted such that the mounting elements of the parts engage each other, rather than any particular mounting structure formed on the lure body. In light of this disclosure, suitable structures for this purpose would be recognized by those skilled in the art. For example, such as is shown in FIG. 11, a tab 68 on one of the parts 42, 44 may have a cooperative slot or aperture 70 formed on the other of the parts 42, 44, so that the parts are able to releasably engage each other to hold the parts in the mounted condition on a lure body having no structures for receiving elements of the parts of the cover assembly.

Moreover, it is contemplated that a variety of differently cover assemblies may be interchangeably mountable on a single lure body to permit the user to switch between assemblies having different colors, shapes, textures, reflectivities, or any other means of attracting a fish to the lure that may be varied to appeal to different fishes under different conditions. Thus, although only one cover assembly is illustrated without any decoration, many differently configured cover assemblies may be employed with the same lure body.

Although the lure is illustratively depicted as a plug lure, the application of the concepts disclosed herein are not so limited, and other types of lures may also benefit from the application of the inventive concept.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A fishing lure with changeable appearance, comprising:
a lure body having a contoured exterior surface, a midline plane extending through the lure body and bisecting the lure body into two lateral sections; and
a cover assembly removably mounted on the lure body, the cover assembly comprising at least two parts configured to cover a portion of the exterior surface of the lure body when the cover assembly is in a mounted condition on the lure body, the at least two parts being separable from the lure body when the cover assembly is in a dismounted condition;
wherein each of the at least two parts comprises a shell part and each shell part has a perimeter edge, and portions of the perimeter edges of the shell parts meet together when the cover assembly is in the mounted condition on the lure body;
wherein the lure body has a front end and a rear end with an axis extending between the front and rear ends, the contoured exterior surface of the lure body being substantially circular in at least one plane oriented perpendicular to the axis, wherein each shell part includes a plurality of mounting elements formed on the shell part to removably mount the shell part on the lure body, a plurality of slots being formed on the exterior surface of the lure body and each being configured to removably receive one of the mounting elements on one of the shell parts.

2. The lure of claim 1 wherein the removable cover assembly covers substantially an entirety of the exterior surface of the lure body when in the mounted condition on the lure body.

3. The lure of claim 1
wherein each shell part is configured to cover a portion of the exterior surface of the lure body located on one side of the midline plane.

4. The lure of claim 1
wherein each shell part is configured such that the inner surface of the shell part is positioned directly adjacent to the exterior surface of the lure body to cover substantially an entirety of the exterior surface of the lure body located on one side of the midline plane so that the parts of the cover assembly collectively cover both lateral sides of the lure body.

5. The lure of claim 1 wherein each shell part includes a contoured wall having an inner surface and an outer surface with a thin substantially uniform thickness therebetween, the inner surface being contoured to generally correspond to the contoured exterior surface of the lure body.

6. The lure of claim 1 wherein at least a portion of the perimeter edge of a first shell part abuts against a portion of the perimeter edge of a second shell part in the mounted condition of the cover assembly on the lure body.

7. The lure of claim 1 wherein each of the shell parts includes a contoured wall having an inner surface and an outer surface, and each of the shell parts has a perimeter edge located between the inner and outer surfaces, the perimeter edge of each shell part having an upper portion and a lower portion, the upper and lower portions of each shell part defining an edge plane, the edge plane of each shell part corresponding to the midline plane of the lure body when the shell part is in the mounted condition on the lure body.

8. The lure of claim 1 wherein the perimeter edge of each shell part includes an upper portion of the perimeter edge and a lower portion of the perimeter edge, the shell parts of the cover assembly being configured with respect to the lure body such that, when the cover assembly is in the mounted condition on the lure body, the upper portions of the perimeter edges of the parts meet together and the lower portions of the perimeter edges of the parts meet together to substantially cover the entirety of the exterior surface of the lure body.

9. The lure of claim 1
wherein at least one of the plurality of mounting elements formed on said shell part comprises a tab that is configured to be engaged with a corresponding slot formed in the lure body when the cover assembly is in the mounted condition and be disengaged from the slot when the cover assembly is in the dismounted condition.

10. The lure of claim 1
wherein at least one of the plurality of mounting elements is located along a perimeter edge of the shell part.

11. The lure of claim 1 wherein the lure body has a keel line extending along an intersection of the midline plane and the exterior surface along a bottom of the lure body, and
additionally comprising at least one attachment element on the lure body providing a point of attachment for a hook, the at least one attachment element being located along the keel line of the lure body such that the attachment element extends between the shell parts of the cover assembly.

12. The lure of claim 1 additionally comprising an appendage mounted on the lure body and extending from the exterior surface of the lure body, a shoulder extending along at least a portion of a juncture between the appendage and the exterior surface of the lure body, at least one of the parts of the cover assembly engaging the shoulder such that the shoulder helps to hold said at least one part of the cover assembly in the mounted condition.

13. The fishing lure of claim 1 wherein the lure body has a midsection between the front and rear ends, the exterior surface having a shape resembling a fish with a height dimension that tapers smaller from the midsection toward the rear end and from the midsection toward the front end, and a width dimension in a direction oriented perpendicular to the height dimension that tapers smaller from the midsection toward the rear end and from the midsection toward the front end.

14. The lure of claim 1 wherein each of the shell parts of the cover assembly is configured to removably mount on the lure body in a manner so that the shell parts in the mounted condition of the cover assembly are removable from the lure body to produce the dismounted condition and the shell parts in the dismounted condition of the cover assembly are mountable on the lure body to produce the mounted condition.

15. The lure of claim 1 wherein each of the lateral sections of the lure body has a portion of the exterior surface that bulbously protrudes outwardly with respect to the midline plane.

* * * * *